United States Patent
Beckett et al.

(10) Patent No.: US 7,555,421 B1
(45) Date of Patent: Jun. 30, 2009

(54) DEVICE EMULATION FOR TESTING DATA NETWORK CONFIGURATIONS

(75) Inventors: William Beckett, Marlboro, NJ (US); Brian Freeman, Farmingdale, NJ (US); Joseph Niederberger, Atlantic Highlands, NJ (US)

(73) Assignee: AT&T Corp., New York, NY (US)

( * ) Notice: Subject to any disclaimer, the term of this patent is extended or adjusted under 35 U.S.C. 154(b) by 615 days.

(21) Appl. No.: 11/263,063

(22) Filed: Oct. 28, 2005

(51) Int. Cl.
*G06F 9/455* (2006.01)
*H04L 12/24* (2006.01)

(52) U.S. Cl. .................. 703/23; 712/208; 713/201; 709/220

(58) Field of Classification Search .............. 703/23, 703/24, 22; 713/201; 712/208; 719/320; 709/220
See application file for complete search history.

(56) References Cited

U.S. PATENT DOCUMENTS

| | | | | | |
|---|---|---|---|---|---|
| 5,974,532 | A | * | 10/1999 | McLain et al. | 712/208 |
| 6,295,518 | B1 | * | 9/2001 | McLain et al. | 703/23 |
| 7,013,467 | B1 | * | 3/2006 | McLain et al. | 719/320 |
| 7,328,145 | B2 | * | 2/2008 | Jackson et al. | 703/24 |
| 2003/0212908 | A1 | * | 11/2003 | Piesco | 713/201 |
| 2006/0161508 | A1 | * | 7/2006 | Duffie et al. | 706/55 |

* cited by examiner

*Primary Examiner*—Thai Phan (57) ABSTRACT

A system and method for providing a virtual implementation of a large scale network of devices. The invention emulates an entire network of network devices using the configuration information obtained from the actual devices to meet the needs of testing configuration changes across the entire network.

18 Claims, 6 Drawing Sheets

DEVICE EMULATION FOR TESTING DATA NETWORK CONFIGURATIONS

BACKGROUND

The invention relates generally to testing networks. More specifically, embodiments of the invention relate to systems and methods for emulating a network based on device configurations derived from devices used in the network.

An enterprise network refers to a network belonging to an enterprise consisting of thousands of computers distributed across geographically remote locations and connected by wide area network (WAN) links. Enterprise level networks typically use transmission control protocol/internet protocol (TCP/IP) and are divided into a number of smaller networks called subnets which are linked by devices known as routers. These networks are often heterogeneous networks consisting of different protocols and operating systems all interoperating to various degrees.

A typical network spanning a large geographical area contains a collection of machines or hosts, intended for running user programs. The hosts are connected together by a local area network (LAN), with each LAN connected together by a communication subnet that carries messages from host to host. The network separates the pure communications aspects of the network (subnet) from the application aspects (hosts).

In most WANs, the subnet consists of two distinct components, transmission lines and switching elements. The switching elements are specialized computers used to connect two or more transmission lines. When data arrives on an incoming line, the switching element must choose an outgoing line to forward them on. The switching elements are referred to as packet switching nodes, or more generically, routers.

A router is a device that forwards data packets along networks. A router is connected to at least two networks, commonly two LANs or WANs or a LAN and its Internet service provider's (ISP) network that provides Internet access using a peer network consisting of thousands of high-speed routers that pass IP routes and traffic among one another.

Figure 1:
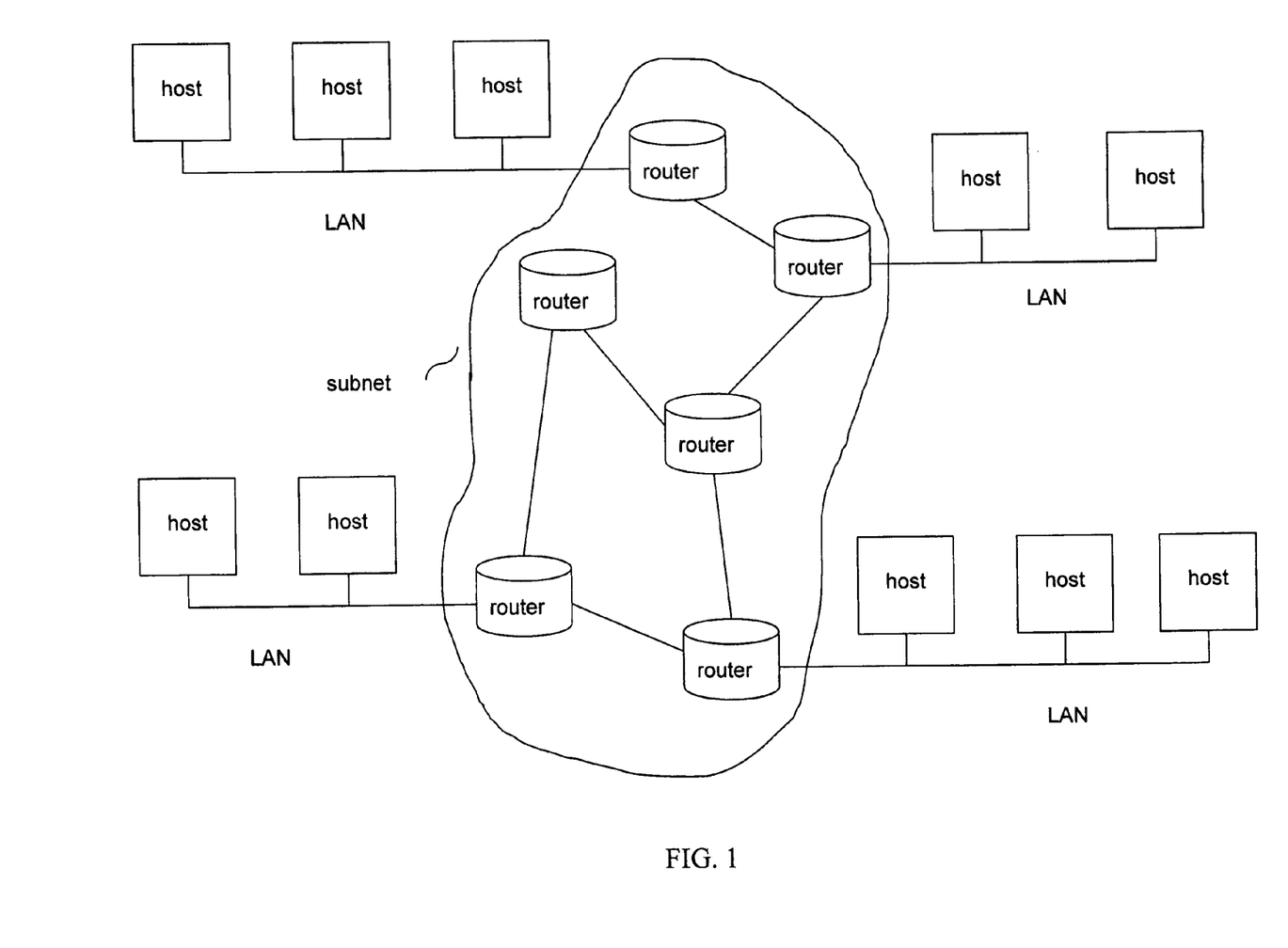
FIG. 1 is a diagram of an exemplary network.

Shown in FIG. 1 is a network where each host is connected to a LAN on which a router is present. Routers are located at gateways, the places where two or more networks connect. Routers use headers and forwarding tables to determine the best path for forwarding packets and use protocols such as Internet control message protocol (ICMP). A host can also be connected directly to a router. The collection of communication lines and routers form a subnet.

The term subnet generally refers to the collection of routers and communication lines that move data packets from a source host to a destination host. For most WANs, the network contains numerous cables or telephone lines each connecting a pair of routers. If two routers that do not share a cable wish to communicate, they must do this indirectly via other routers. When a packet is sent from one router to another via one or more intermediate routers, the packet is received at each intermediate router in its entirety, stored there until the required output line is free, and then forwarded. A subnet using this principle is referred to as packet-switched.

Routers used in the Internet are linked together in a web. The packets follow a path of least resistance to ensure they arrive at their destination in a reasonable amount of time. Packets should go through the least number of routers to get to their final destination. However, since there may be congestion clogging the ideal path, routers send traffic around the congested parts of the Internet increasing speed and efficiency. The routers that make up the backbone of the Internet can reconfigure the paths that the packets take since they observe all information surrounding each data packet and inform other routers about line conditions such as problems sending and receiving data on various parts of the Internet.

Network simulation is used to develop, test, and debug new protocols, to explore and study a specific network-related research issue, or to evaluate the performance of an existing protocol or scheme. The purpose of a network simulator is to study the dynamic behavior of flow and congestion control schemes in packet-switched data networks. Simulation provides users with a way of specifying networks and to simulate their behavior.

Network simulators such as NS (Network Simulator), which is widely used in the networking community, generally provide a rich set of protocol modules and configuration tools that can be easily used to conduct customized simulation experiments. However, the functionalities provided by the modules in network simulators are logical operations rather than real implementations. Therefore, a protocol implementation in a network simulator must be modified before being deployed to a target network.

Network emulation is the execution of real network protocol implementation code in a controllable and reproducible laboratory network environment. Unlike simulation, the protocols and applications as well as the interaction between protocols are "real." Network traffic physically traverses the emulation environment, in which underlying protocols are tested and evaluated against user-defined network conditions and traffic dynamics, such as packet latency, link bandwidth, packet drop rate, bit error rate (BER), and link failure.

Most existing network emulators can only provide an environment for end-to-end protocol evaluation since they abstract a network cloud to a simple router with specific packet handling operations. Therefore, topology related protocols cannot be evaluated with those emulators.

Some emulators employ a simple one-to-one mapping scheme to emulate a target network topology in a LAN. However, when the target network is quite large, the emulation environment will be too costly to establish.

There are a variety of projects which support software router emulation. Zebra is a popular open source project of this type. These projects are focused on implementing IP routing functionality on general-purpose computing devices. However, the commands used to configure these devices are specialized and do not mimic the commands seen in traditional routers. There are other software emulators which do mimic the specific command set of a vendor's router. However, these are found as part of certification training packages which are designed to support a single user on a personal computer.

Normally, end-to-end testing is only accomplished on a limited set of test devices which are added to the production database image. What is needed is an application that can develop and test end-to-end network functionality using a production network database image that does not have to be altered, and can test configuration changes across an entire network of devices, not a small sample of real devices. Further, the breadth of end-to-end transactions is vastly increased, since a normal test environment is limited in the types of hardware and connectivity that is supported.

SUMMARY OF THE INVENTION

The inventors have discovered that it would be desirable to have systems and methods that provide a virtual implementation of a large scale network of devices. The inventors have arrived at systems and methods that provide an extended ability to emulate an entire network of network devices using the configuration information obtained from the actual devices to meet the needs of testing configuration changes across the entire network, not a small sample of real devices.

One aspect of the invention provides methods for emulating a network. Methods according to this aspect of the invention preferably start with receiving configurable files for a plurality of configurable network devices, creating virtual network interfaces from addresses from the configurable network devices files, creating a virtual instance for each of the configurable network devices, mapping the network device addresses into a separate thread, and emulating the plurality of virtual instances in a virtual network environment.

Another aspect of the method is configuring a host operating system for the virtual network environment to support queries based on the received device configurations.

Another aspect of the method is creating ingress and egress access points for each of the received configurable network device configuration files.

Yet another aspect of the invention is viewing emulation operations and status using a command line interface.

Other objects and advantages of the systems and methods will become apparent to those skilled in the art after reading the detailed description of the preferred embodiments.

DETAILED DESCRIPTION OF THE PREFERRED EMBODIMENTS

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

It should be noted that the invention is not limited to any particular software language described or implied in the figures. One of ordinary skill in the art will understand that a variety of alternative software languages may be used for implementation of the invention. It should also be understood that some components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions that receive configurable files from a plurality of network devices and creates a virtual instance of each device emulating their presence in a virtual network. The application functionality can emulate an actual production network based on the actual connectivity devices comprising the network. A network is modeled using collected information from network devices such as servers, printers, hubs, switches and routers on an IP network. The control or behavior of a device is defined in its configuration file which directs all traffic going through the device. Although exemplary embodiments are described herein with reference to particular network devices, architectures, and frameworks, nothing should be construed as limiting the scope of the invention.

The invention is a modular framework and is deployed as software as an application program tangibly embodied on a program storage device. The application code for execution can reside on a plurality of different types of computer readable media known to those skilled in the art.

In one embodiment, the invention provides a means for router configuration servers to access what appears to be a production network. The invention comprises a combination of software comprising UNIX administration and Cisco router configurations. The invention emulates an entire production network using one server and one router providing a cost-effective means to provide configuration testing for a plurality of devices.

A router is used to route requests via IP from a distribution server that is being load tested, to all of the IP addresses of the routers being emulated. The router is the internetworking between the server and the emulators. The router realistically tests a large number of destinations at the IP level.

The invention allows for emulating an entire network of configurable devices for the purpose of examining network configuration changes. The changes can range from adding new components or features to a network, or deleting existing components or features from a network. The invention supports configuration commands via Telnet, simple network management protocol (SNMP) and trivial file transfer protocol (TFTP). One example of the invention may be implemented as a Java based Telnet server which implements its own operating system (OS) to process commands. The operating system can be extended to emulate any device that is accessible via Telnet. Telnet is a standard protocol for executing commands on remote hosts and is distributed with all Microsoft Windows operating systems. Telnet is a common way to remotely control Web servers.

Telnet is a terminal emulation program for transmission control protocol/Internet protocol (TCP/IP), the suite of communication protocols used to connect hosts on the Internet. TCP/IP uses several protocols, the two main ones being TCP and IP. TCP/IP is built into the UNIX operating system and is used by the Internet, making it the de facto standard for transmitting data over networks. The Telnet program runs on a computer and connects the computer to a server on the network. Commands are entered through the Telnet program and executed as if entered directly on a server console allowing a user to control the server and communicate with other servers on the network. To begin a Telnet session, a user must first log in to a server by entering a valid username and password.

A network can also be modeled prior to physical implementation based upon a proposed network architecture that includes a plurality of configurable devices and configuration files created for each device. The invention supports the capability to configure these devices using configuration data and software components compatible with the devices used in a proposed system. The invention provides a virtual implementation of a large-scale network.

The invention creates an environment which emulates a production network for the purposes of developing and testing network device configuration software. The invention supports large-scale load testing of configuration changes to network devices without risk of damaging an actual network and the development of future network provisioning applications.

As one example of a network device, and by way of background, a typical router contains three file types, two permanent files—internetwork operating system (IOS) software which cannot be altered and a configuration file, and dynamic files created by the router itself during operation. The IOS is similar to a conventional computer OS in that it is dedicated to running the device it is loaded on and acts as an interface. The IOS is concerned with forwarding data packets unchanged to their next destination. IOS commands are used to interact with a router.

The configuration file contains management instructions directing the IOS. The configuration file defines the network interface hardware, the protocols to support, what packets get through, and other functions.

Dynamic files are created and maintained by the router in order to adapt on a moment by moment basis. Dynamic files change minute by minute in response to network traffic. While instructions cannot be placed in dynamic files, the behavior of the files can be controlled indirectly by setting parameters in the configuration file.

The configuration file is secure and cannot be directly edited. Configuration files cannot be edited in real time, nor compiled and debugged as when turning source code into executable code. Configuration files are modified by entering IOS commands and then viewing the new configuration to examine the results. The configuration file is the point of control over a router, and therefore the entire network. The configuration file and the dynamic files hold information needed to analyze network problems. The configuration file indicates how a router is setup—dynamic files show how the setup is working in the network environment.

As previously described, a router interacts with other routers. Therefore, a configuration file for a respective router is loaded with interdependencies. Every new router added to a network increases complexity exponentially.

Router configuration mistakes are not immediately apparent in the form of operational problems. Many problems remain latent, residing in configuration files across an entire network. Modifying a configuration file typically means making a change to that router's behavior and considering all effects that might flow from that change. Internetworks magnify changes by passing them down the line. An average configuration file controls more than one router and is maintained for groups of routers.

Configuration files can be obtained from each device physically used in a network on a periodic basis either directly through a console or AUX ports, or via a network using either Telnet or hypertext transfer protocol (HTTP). Systems external to the network can use the invention using standard configuration protocols such as the Telnet program and TFTP.

The files can be copied, saved and distributed to other routers via a TFTP server. The invention framework uses an OS which manages resource use for each configurable device. Each device configuration can then be modified using each device's configuration file and adding generated software components. The software components can implement business logic and dependencies which are an extension of the normal device error checking. The result is that the software components can be configured to generate errors that would not be detected by the device, but would cause a service implementation error.

Figure 2:
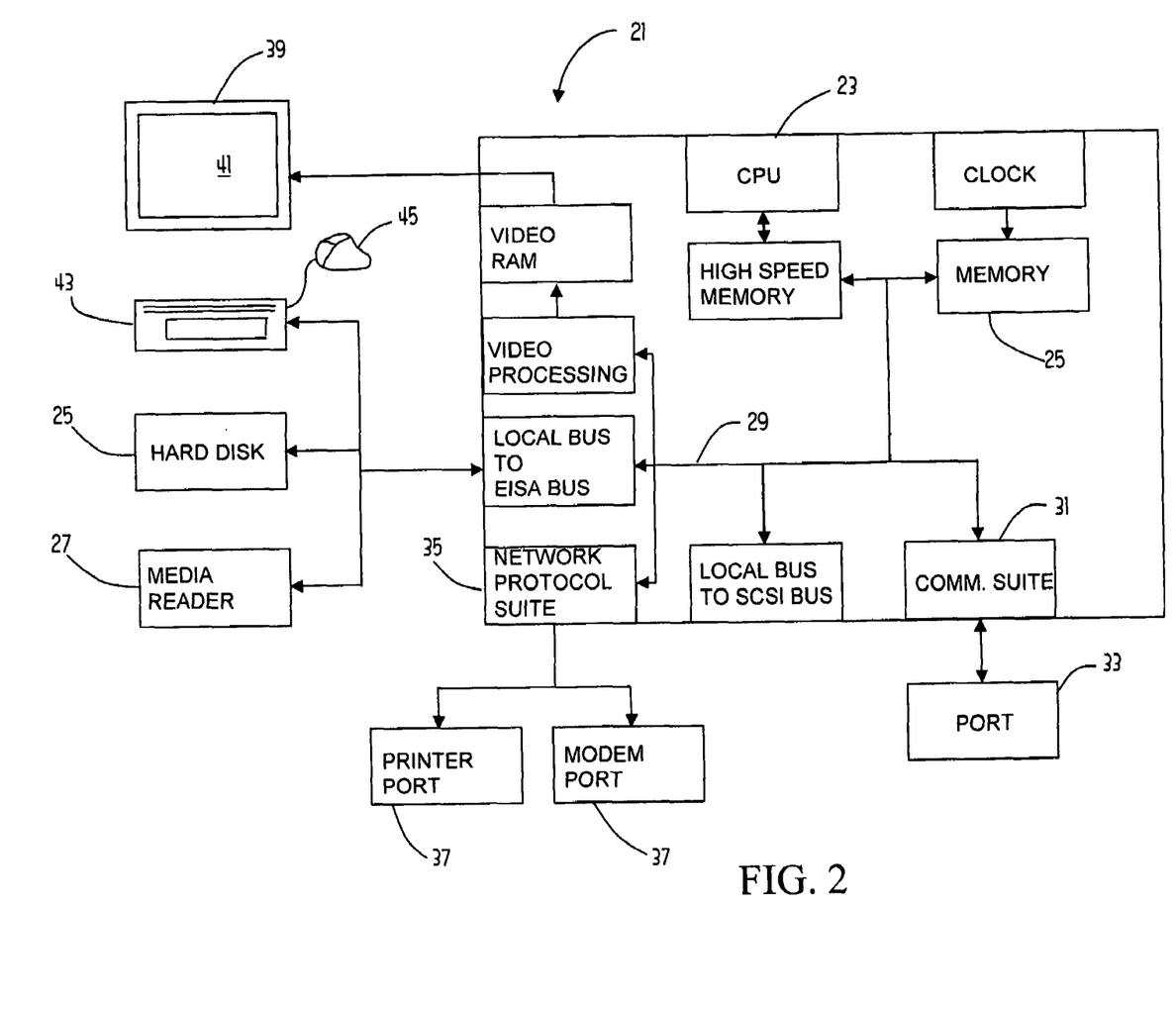
FIG. 2 is a block diagram of an exemplary computer.

An embodiment of a computer 21 executing the instructions of an embodiment of the invention is shown in FIG. 2. A representative hardware environment is depicted which illustrates a typical hardware configuration of a computer. The computer 21 includes a CPU 23, memory 25, a reader 27 for reading computer executable instructions on computer readable media, a common communication bus 29, a communication suite 31 with external ports 33, a network protocol suite 35 with external ports 37 and a GUI 39.

The communication bus 29 allows bi-directional communication between the components of the computer 21. The communication suite 31 and external ports 33 allow bi-directional communication between the computer 21, other computers 21, and external compatible devices such as laptop computers and the like using communication protocols such as IEEE 1394 (FireWire or i.LINK), IEEE 802.3 (Ethernet), RS (Recommended Standard) 232, 422, 423, USB (Universal Serial Bus) and others.

The network protocol suite 35 and external ports 37 allow for the physical network connection and collection of protocols when communicating over a network. Protocols such as TCP/IP suite, IPX/SPX (Internetwork Packet eXchange/Sequential Packet eXchange), SNA (Systems Network Architecture), and others. The TCP/IP suite includes IP, TCP, ARP (Address Resolution Protocol), and HTTP. Each protocol within a network protocol suite has a specific function to support communication between computers coupled to a network. The GUI 39 includes a graphics display such as a CRT, fixed-pixel display or others 41, a key pad, keyboard or touchscreen 43 and pointing device 45 such as a mouse, trackball, optical pen or others to provide an easy-to-use, user interface for the invention.

The computer 21 can be a handheld device such as an Internet appliance, PDA (Personal Digital Assistant), or conventional personal computer such as a PC, Macintosh, server, or UNIX based workstation running their appropriate OS capable of communicating with a computer over wireline (guided) or wireless (unguided) communications media. The CPU 23 executes compatible instructions or software stored in the memory 25. Those skilled in the art will appreciate that the invention may also be practiced on platforms and operating systems other than those mentioned.

The invention is a file management tool. It can input a base configuration file and update the file with changes submitted via software. The invention determines the critical parts of a configuration, parses the configuration, and loads and processes the device configuration as the actual device would execute its configuration. The invention assists in determining which configuration change should return a network error.

Figure 3:
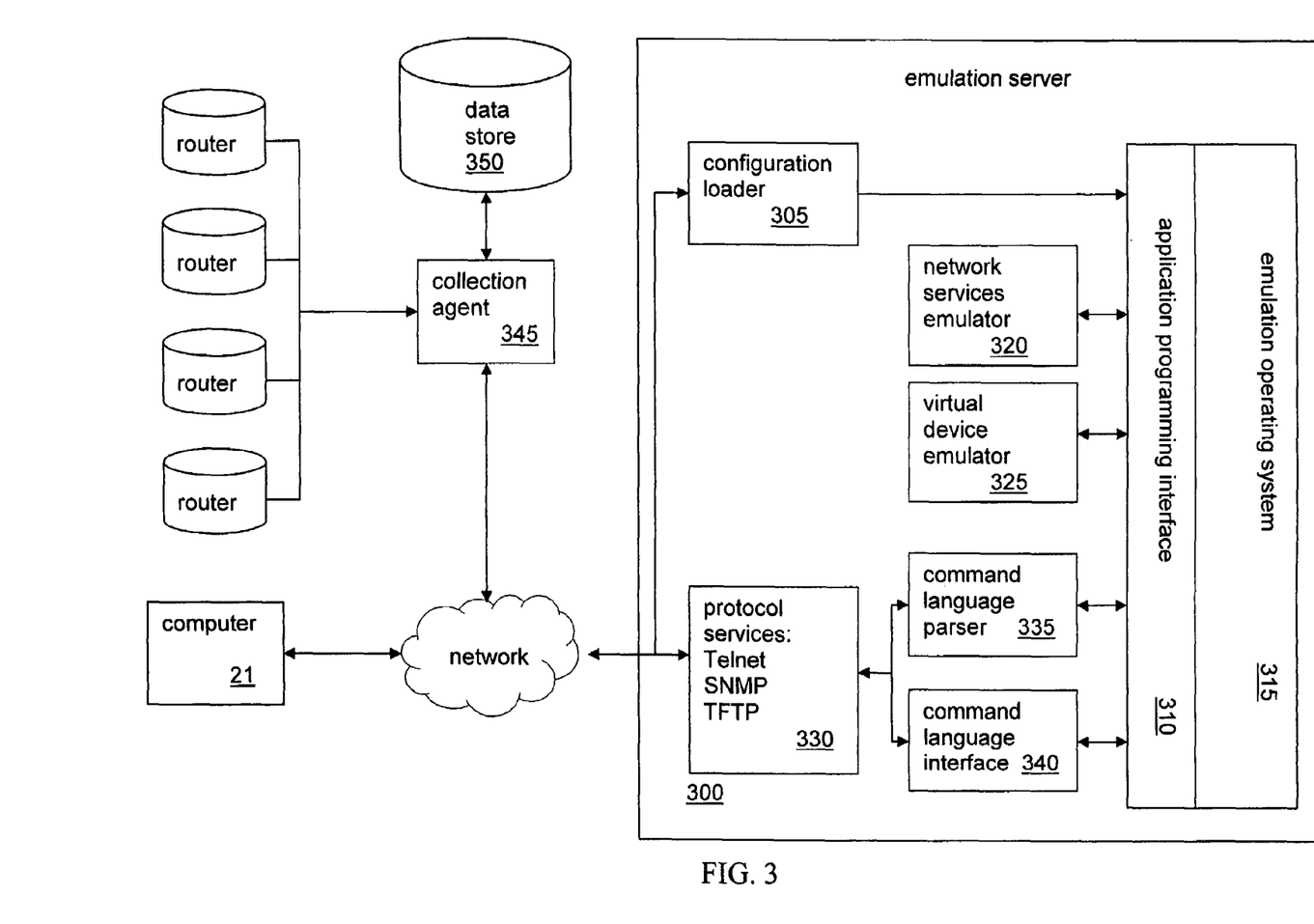
FIG. 3 is an exemplary framework of the individual modules of the invention.
Figure 4A:
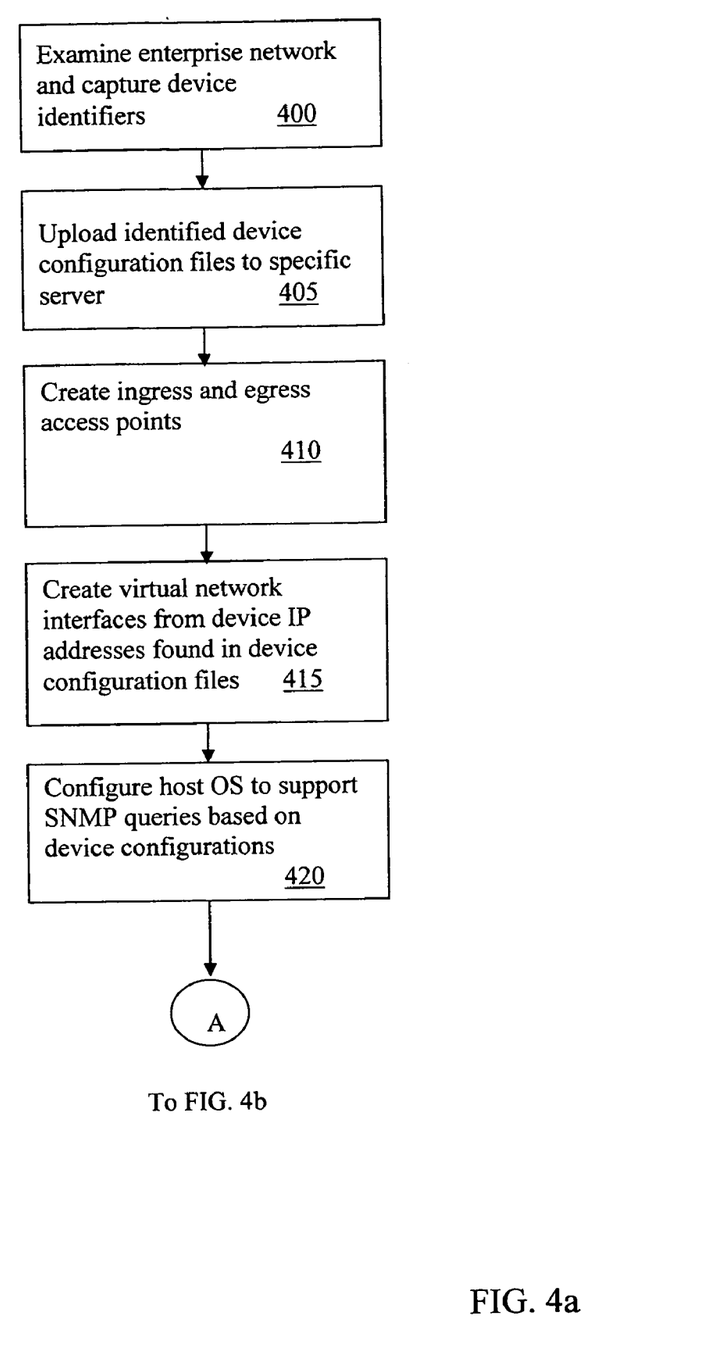
FIGS. 4a and 4b is a block diagram of an exemplary method according to an embodiment of the invention.
Figure 4B:
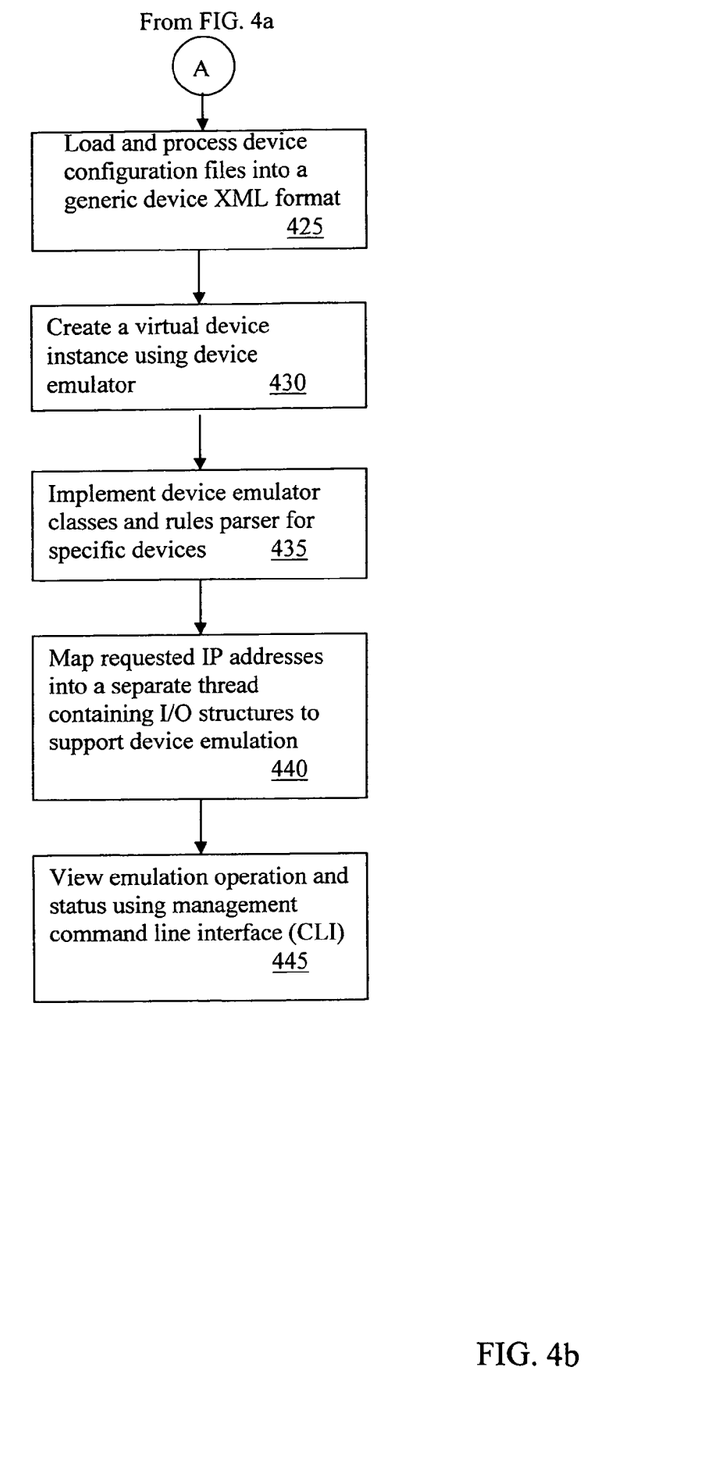
Figure 5:
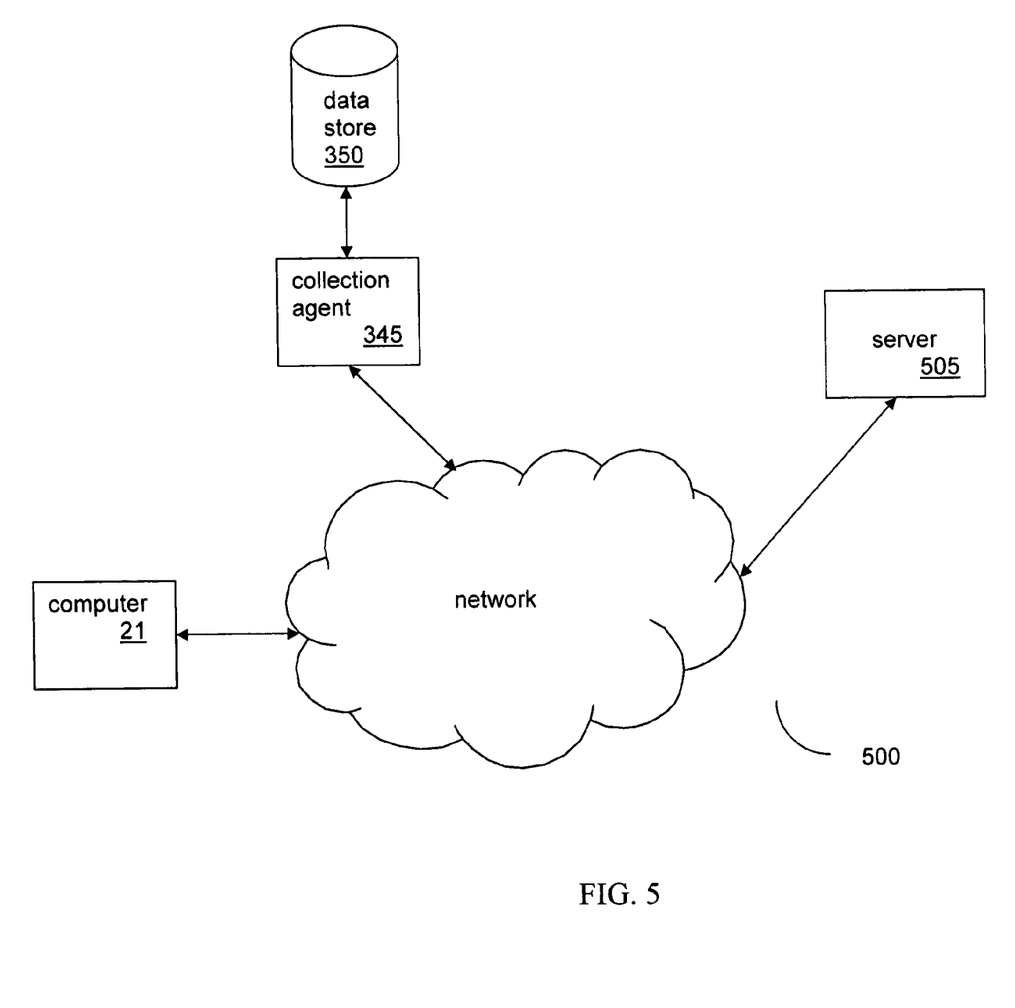
FIG. 5 is an exemplary network architecture of the network emulator according to an embodiment of the invention.

Shown in FIG. 3 is a framework of the various modules that comprise the invention 300. Shown in FIGS. 4*a* and 4*b*, and 5, is a flowchart and network architecture of a system and method for network device emulation according to one embodiment of the invention. The invention framework 300 allows effective integration of database information and device emulation through a set of coupled modules comprising the invention 300. The modules include a configuration loader 305, an application programming interface (API) 310, a resident OS 315, a network services emulator 320, a virtual device emulator 325, a protocol services interface 330, a command language (string) parser 335, and a command language interface (CLI) 340.

Users access the framework 300 by using a GUI 39 presented by a work station or computer 21. A user examines a network 500 for devices to be emulated (step 400) using the GUI 39 and Telnet interface on a computer 21 to communicate with the remote server 505 where the invention may be resident. The devices for emulation are identified by IP address, name or other indicia. Configuration files corresponding to the identified devices are uploaded to a central data store 350 via a collection agent 345 (step 405). The user downloads identified configuration files from the data store 350 to the server 505 where the invention framework 300 resides. The configuration loader 305 receives each device configuration file for processing.

The invention uses the device configurations and commands to perform network emulation. Implementing a device or network of devices requires that configuration files are available from a UNIX file-system. There are stored configuration files for routers that makeup an Internet routing network of access routers. The invention uses the configuration file for each device to create a device emulation.

The invention is able to present an entire network of routers. This is accomplished using what appears to the user as an intermediate host that emulates an interface to multiple devices. The intermediate host provides a single point (the interface) that appears as many hundreds, or thousands, of devices. The calling application is first presented with a login/password challenge that mimics an intermediate host. This type of host device is used as a bridge between the network the application is resident on and the actual production network. After a successful login, the application will then run a Telnet command to the specific device name. The invention uses Telnet commands to load emulation settings for the particular device. After the Telnet command is executed, the application will appear to be presented with a router access prompt.

In this embodiment, users interact with the invention 300 over a Telnet interface through the protocol services 330 and command language parser 335. A user can direct configuration file changes and load testing of an assembled network. The invention implements a command language parser 335 which responds as a specific device via the configuration protocol. Apache Ant and Javac (Java compiler) are the build tools. Javac compiles a Java program into an executable program and is used to generate the command language parser 335 Java class using a command line parser file. All command syntax is coded in the command language parser 335. Ant is used to build the Java class files. Processing a command string entered by a user is passed to the parser 335 which results in either a command to be run or an error. Command mode is immediately stopped when an exit command is found.

The Telnet commands are easier to process since they are processed a single line at a time and the context of the command is built over the duration of the session. Commands submitted via TFTP are generally more complex since the invention needs to establish the context for the set of commands before processing each line in the file. TFTP processing consists of breaking received commands into individual lines, and then submitting them to the command language parser 335. If a command from within a TFTP file is not recognized, no error will be returned. File based processing will only return errors for commands that have been specifically implemented. However, if a command is send directly via a Telnet session, it will return an error if it is not recognized.

The invention is designed to support interaction via an Element Management System (EMS) rather than interactions from human operators. The invention is a tool that is driven by the automated dialogue that occurs between an EMS and devices that it can manage. The invention does not require many of the rich features that are available to human operators, such as context sensitive help and many runtime status commands. The invention software is focused on supporting large numbers of devices which can support large numbers of concurrent connections rather than supporting each and every nuance of a device's command set.

Configuration files are forwarded to the virtual device emulator 325 via the application programming interface 310 and OS 315.

The software parses the router configuration and looks for the interfaces that mark the ingress and egress connections into a router. Egress connections point towards the Internet and ingress connections point toward a customer. Both sets of connections need to be stored in the application since the commands being emulated can apply to either the ingress or egress connections. This refers to customer facing interfaces (e.g., LAN side) and network facing uplinks (e.g., WAN side) interfaces in the configuration, but in the network it is WAN to WAN.

After device configuration files are loaded and all addressing points are identified (step 410), network interfaces are created by the network services emulator 320 from the device IP addressing (step 415). The result is a mimic of a large network of specific devices.

The invention configures the emulation OS to support SNMP queries based on the device configurations (step 420). SNMP is a protocol for network management. SNMP is an Internet-standard Layer-7 (application layer) protocol for collecting information from and configuring network devices on an IP network. SNMP can be can be used to collect information about statistics from these devices and to relay this information to a central management console to monitor network health, trap errors, perform diagnostics, and generate reports. SNMP can be used to for reading and modifying device configuration information such as the IP address of an interface, or the version of the OS running on the device.

The invention loads and processes the device configurations into a generic XML format (step 425). It is easier to write the logic for manipulating the configuration in XML due to its tagged structure.

A virtual instance is created using the device emulator (step 430). The emulator accepts the configuration information for each device and presents a configurable device to the provisioning application. The device emulator 325 creates an instance of what appears to be the actual device, emulating all of the IP addressing for the device. The device emulator 325 examines a received and loaded device configuration file and knows, a priori, what type of device the loaded file configures (e.g., a router, switch, etc.). Features appropriate for the device type can be listed, chosen, and modified accordingly by a user when performing emulation. A user communicates with the invention framework 300 via Telnet from his computer 21.

Each device instance emulates a personality for the actual device type, aspects such as command lines, the configuration interface for the device, and others. Each emulation of one physical router is a device instance. The emulator does not create functional, hardware aspects such as the ability to pass network traffic, execute instructions, or simulate activities of the device.

Classes and rules parsers are implemented for each device instance (step 435).

The emulator 325 emulates IP addressing for the device and allows a configurable personality of the device under emulation to be available on a wider basis. Requested IP addresses are mapped into a separate thread containing I/O structures to support emulation (step 440). The emulator operates in conjunction with the network services emulator 320.

A management command line interface can view status and operation of invention (step 445). Load tests are a series of simultaneous transactions performed in a finite period of time, namely, how many transactions per hour can be passed through the network. A user configures a network using the network services emulator 320 in conjunction with the virtual device emulator 325. A user can write software to configure a network with the chosen network devices and test the software/configuration changes.

Another embodiment of the invention comprises multiple servers connected to an Altheon switch used for load balancing. The switch implements a virtual IP address which will round robin between each of the servers.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for emulating a defined enterprise network comprising:
   examining the enterprise network;
   selecting one or more configurable network device employed in the enterprise network;
   acquiring configurable files from the selected one or more configurable network device;
   creating a virtual network interface for each address of each acquired configurable network device configurable file;
   creating a virtual instance for each selected one or more configurable network device;
   mapping the network device addresses into a separate thread; and
   emulating the enterprise network using the virtual instances in a virtual network environment.

2. The method according to claim 1 further comprising configuring a host operating system for the virtual network environment to support network routing queries based on a virtual instance.

3. The method according to claim 1 further comprising processing the acquired configurable network device configurable files into a generic XML format.

4. The method according to claim 1 further comprising implementing device emulator classes for each virtual instance.

5. The method according to claim 1 further comprising implementing a rules parser for each virtual instance.

6. The method according to claim 1 further comprising performing a load test of the virtual network environment.

7. The method according to claim 1 further comprising creating ingress and egress access points for each virtual instance.

8. The method according to claim 1 further comprising viewing emulation operations and status using a command line interface.

9. The method according to claim 1 wherein a configurable network device is a router.

10. A system for emulating a defined enterprise network comprising:
    means for examining the enterprise network;
    means for selecting one or more configurable network device employed in the enterprise network;
    means for acquiring configurable files from the selected one or more configurable network device;
    means for creating a virtual network interface for each address of each acquired configurable network device configurable file;
    means for creating a virtual instance for each selected one or more configurable network device;
    means for mapping the network device addresses into a separate thread; and
    means for emulating the enterprise network using the virtual instances in a virtual network environment.

11. The system according to claim 10 further comprising means for configuring a host operating system for the virtual network environment to support network routing queries based on a virtual instance.

12. The system according to claim 10 further comprising means for processing the acquired configurable network device configurable files into a generic XML format.

13. The system according to claim 10 further comprising means for implementing device emulator classes for each virtual instance.

14. The system according to claim 10 further comprising means for implementing a rules parser for each virtual instance.

15. The system according to claim 10 further comprising means for performing a load test of the virtual network environment.

16. The system according to claim 10 further comprising means for creating ingress and egress access points for each virtual instance.

17. The system according to claim 10 further comprising means for viewing emulation operations and status using a command line interface.

18. The system according to claim 10 wherein a configurable network device is a router.

* * * * *